(12) United States Patent
Jones

(10) Patent No.: US 10,752,317 B1
(45) Date of Patent: Aug. 25, 2020

(54) LEG AND ARM POWERED VEHICLE

(71) Applicant: Bill B. Jones, Wichita, KS (US)

(72) Inventor: Bill B. Jones, Wichita, KS (US)

( * ) Notice: Subject to any disclaimer, the term of this patent is extended or adjusted under 35 U.S.C. 154(b) by 241 days.

(21) Appl. No.: 16/026,698

(22) Filed: Jul. 3, 2018

(51) Int. Cl.
   *B62M 1/18* (2006.01)
   *A63B 22/00* (2006.01)
   *B62K 5/003* (2013.01)
   *B62M 1/28* (2013.01)
   *B62M 1/12* (2006.01)

(52) U.S. Cl.
   CPC ........... *B62M 1/18* (2013.01); *A63B 22/0076* (2013.01); *B62K 5/003* (2013.01); *A63B 22/0087* (2013.01); *B62M 1/12* (2013.01); *B62M 1/28* (2013.01)

(58) Field of Classification Search
   CPC . B62M 1/18; B62M 1/12; B62M 1/20; B62M 9/06; B62K 5/003
   See application file for complete search history.

(56) References Cited

U.S. PATENT DOCUMENTS

| | | | |
|---|---|---|---|
| 91,169 A | 6/1869 | Schmitt | |
| 1,650,387 A | * 11/1927 | Pillinger | B62M 1/18 280/223 |
| 2,019,833 A | * 11/1935 | Utz | B62M 1/18 280/210 |
| 3,979,135 A | 9/1976 | Meritzis | |
| 4,198,071 A | 4/1980 | Lohr | |
| 4,632,414 A | 12/1986 | Ellefson | |

(Continued)

FOREIGN PATENT DOCUMENTS

| | | |
|---|---|---|
| CN | 100513248 | 7/2009 |
| DE | 19934817 | 9/2004 |

(Continued)

OTHER PUBLICATIONS

"Home: Why choose a BerkelBike over standard handbikes?," Berkel Bike, berkelbike.com, Apr. 1, 2018. https://web.archive.org/web/20180401080050/https://berkelbike.com/.

(Continued)

*Primary Examiner* — Jacob D Knutson
*Assistant Examiner* — Conan D Duda
(74) *Attorney, Agent, or Firm* — Kenneth H. Jack; Davis & Jack, L.L.C.

(57) ABSTRACT

A leg and arm powered vehicle incorporating a frame; a seat rollably mounted upon the frame for reciprocating motion; a wheel and propulsion sprocket combination mounted upon the frame for vehicle propulsions; a chain operatively engaging the propulsion sprocket, the chain having a pair of flights; a sprocket support member fixedly attached to the seat; rearward and forward drive sprockets, the rearward drive sprocket engaging one of the chain's flights; first rotatable mountable means attaching the rearward drive sprocket to the sprocket support member and being adapted for alternatively resisting counter-rotation of the rearward drive sprocket and permitting rotation of the rearward drive sprocket; second rotatable mounting means attaching the forward drive sprocket to the sprocket support member and being adapted for alternatively resisting counter-rotation of the forward drive sprocket and permitting rotation of the forward drive sprocket; and hand and foot engaging members fixedly mounted to the frame.

12 Claims, 2 Drawing Sheets

(56) References Cited

U.S. PATENT DOCUMENTS

| | | | |
|---|---|---|---|
| 4,796,907 A | 1/1989 | Geller | |
| 4,941,673 A | 7/1990 | Bennett | |
| 4,976,451 A | 12/1990 | Kamenov | |
| 5,330,218 A | 7/1994 | Escudero | |
| 5,601,301 A | 2/1997 | Liu | |
| 5,732,963 A | 3/1998 | White | |
| 5,876,052 A | 3/1999 | Olson et al. | |
| 6,527,676 B1 * | 3/2003 | Frick | A63B 21/156 482/51 |
| 6,609,724 B1 | 8/2003 | Dzvonik | |
| 7,654,545 B1 | 2/2010 | Millirans | |
| 7,862,484 B1 * | 1/2011 | Coffey | A63B 22/0076 482/72 |
| 7,914,422 B1 | 3/2011 | Villanueva | |
| 7,946,963 B1 | 5/2011 | Schreiner | |
| 9,079,061 B1 | 7/2015 | Millirans | |
| 2008/0129007 A1 | 6/2008 | Lee | |
| 2008/0129008 A1 * | 6/2008 | Tarasov | B62M 1/12 280/243 |
| 2012/0061938 A1 | 3/2012 | Lillo | |
| 2015/0197311 A1 * | 7/2015 | Entrekin | B62M 1/24 280/228 |
| 2019/0262661 A1 * | 8/2019 | Stepanian | A63B 21/0435 |

FOREIGN PATENT DOCUMENTS

| | | |
|---|---|---|
| DE | 19906819 | 8/2008 |
| WO | WO94/18059 | 8/1994 |
| WO | WO2006/119601 | 11/2006 |
| WO | WO2007/133046 | 11/2007 |
| WO | WO2015/071838 | 5/2015 |

OTHER PUBLICATIONS

"Handcrank Module," Light Foot Cycles, lightfootcycles.com, pen: Lightfoot Cycles, Jun. 14, 2016. http://lightfootcycles.com/Handcrank-Module.

"Home," Row Bike: The Ultimate Fitness Machine!, rowbike.com, accessed: May 2018. https://www.rowbike.com/.

"Home," Row Cycle, rowcycle.de, Sep. 24, 2017. https://web.archive.org/web/20170924194616/http://rowcycle.de/en/.

"Home," Rowing Bike, rowingbike.com, May 7, 2018. https://web.archive.org/web/20180507141225/https://rowingbike.com/en/.

Coxworth, Ben, "Varibike lets you pedal with your legs- and your arms," New Atlas, newatlas.com, Aug. 23, 2013. https://newatlas.com/varibike-arm-leg-powered-bicycle/28811/.

"Twicycle uses both arms and legs to power bicycle," Design Boom®, designboom.com, Apr. 16, 2016. https://web.archive.org/web/20160416110850/https://www.designboom.com/technology/twicycle-2wd-road-bicycle-04-16-2016/.

\* cited by examiner

LEG AND ARM POWERED VEHICLE

FIELD OF THE INVENTION

This invention relates to leg and/or arm powered vehicles which are adapted for translation of reciprocating seat motion to powered wheel rotation.

BACKGROUND OF THE INVENTION

Where an exercise vehicle is adapted for translating leg powered motions of a seated operator to a rearward motion of the seat with respect to the vehicle, and thence to rotation of a drive wheel, such leg power may be advantageously routed through a variable ratio transmission having a high speed gear ratio. The provision and utilization of such a transmission advantageously allows the operator's most powerful muscles (i.e, the leg muscles) to impart a high speed to the vehicle.

Upon utilizing leg power to rearwardly drive such vehicle's seat, a needed next successive motion is an opposite forward driving or pulling motion exerted upon the seat. Typically, the operator utilizes his or her arms to pull herself and the seat forwardly. Such forward pulling motion may, in a fashion similar to the above described leg drive propulsion, be translated to the drive wheel for further forward propulsion of the vehicle. However, such operator's arms are typically much weaker than her legs, a selected high gear ratio which suitably accommodates rearward leg driving vehicle propulsion will often fail to suitably accommodate the opposite and reciprocating arm powered forward motion of the seat.

The lack of suitability of such high gear ratio for both leg driving and arm pulling vehicle propelling motions may interfere with and delay executions of each successive leg driving and vehicle propelling stroke, undesirably reducing the speed of the vehicle which may be maintained through a quick succession of leg driving motions. In order to prevent such undesirable effects, the instant inventive vehicle advantageously allows the arm powered forward seat returns to freely move or forwardly glide in an idler fashion without engaging the variable ratio transmission which is set for leg propulsion.

In contrast with the marked strength differential which exists between leg powered rearward seat driving and arm powered forward seat pulling, the operator's arms are typically capable of exerting roughly equal forces during arm powered pulling and pushing actions. In contrast with the above described undesirability of continuous drive transmission engagement during leg pushing and arm pulling motions, such continuous transmission engagement becomes desirable when the vehicle's muscle powered propulsion is provided by alternating pushing and pulling motions of the operator's arms. The gear ratio which accommodates vehicle propulsion through rearward arm powered pushing of the seat is typically roughly equal to a gear ratio which accommodates next successive arm powered pulling motions. Accordingly, a power transfer relationship different than that which optimizes alternating leg and arm powered motions is needed for accommodating the alternative exclusively arm powered pushing and pulling mode of operation.

The instant inventive leg and arm powered vehicle associates a specialized assembly of one way and idler sprockets with a reciprocatingly moveable seat for facilitating alternating leg and arm power exercise mode, and for alternatively facilitating exclusive arm powered pushing and pulling vehicle propelling exercise.

BRIEF SUMMARY OF THE INVENTION

A first structural component of the instant inventive leg and arm powered vehicle comprises a rigid frame having front and rear ends. In a preferred embodiment, the rigid frame is composed of tubular aluminum structural members. The frame preferably comprises upper longitudinally extending frame members which support or are adapted to function as seat roller tracks.

A further structural component of the instant invention comprises the seat which is preferably rollably mounted upon the frame for reciprocating or alternating frontward and rearward motions with respect to the frame.

A further structural component of the instant invention comprises a propulsion wheel and propulsion sprocket combination mounted rotatably to the frame. In a preferred embodiment, the vehicle is configured as a tricycle having paired or left and right vehicle stabilizing rear wheels. In such configuration, one of such wheels (or suitably both wheels) may advantageously serve as the vehicle's propulsion wheel. The propulsion sprocket component of such combination turns such wheel via a laterally interconnecting drive axle.

A further structural component of the instant inventive vehicle comprises a continuous loop chain (such as a common bicycle chain) which operatively engages the propulsion wheel and sprocket combination's sprocket. Powered cycles or rotations of the continuous loop chain advantageously rotate the propulsion sprocket, thereby rotating the invention's propulsion wheel.

A further structural component of the instant inventive vehicle comprises a sprocket support member which is rigidly attached to the seat component. Reciprocating forward and rearward motions of the seat translate to simultaneous powered forward and rearward motions of the attached sprocket support member. In a preferred embodiment, the sprocket support member extends from the seat to a position adjacent the continuous loop chain so that the seat impelled reciprocating forward and rearward motions of the sprocket support member travel parallel to the chain's upper and lower flights.

A further structural component of the instant inventive vehicle comprises a rearward drive sprocket which is mounted rotatably upon the sprocket support member, and which is adapted for translating powered rearward motions of the seat and the sprocket support member into a rearward pulling force against one of the continuous loop chain's flights, preferably the lower flight. In a preferred embodiment, such first rotatable mounting means are adapted for alternatively resisting counter-rotation of the rearward drive sprocket upon the rearward motions of the seat and the sprocket support member, and for permitting free rotation or opposite turning motion of such sprocket in an idler wheel fashion.

A further structural component of the instant inventive vehicle comprises a forward drive sprocket mounted to the sprocket support member, such sprocket engaging the other flight among the continuous loop chain's pair of flights. Second rotatable mounting means are preferably provided for operatively attaching the forward drive's sprocket to the sprocket support member. Like the first rotatable mounting means, the second rotatable mounting are preferably adapted for alternatively resisting counter-rotation and permitting free rotation of such sprocket.

Further structural components of the instant inventive arm and leg powered vehicle comprise hand and foot engaging members which are fixedly mounted to the frame, and are positioned forwardly from the seat in order to allow arm and leg powered motions of a seated operator to reciprocatingly drive the seat forwardly and rearwardly along the frame.

In a preferred embodiment, the invention's first and second mounting means comprise one way ratchets which operate to prohibit counter-rotation, and are further operable to freely permit sprocket rotation in an idler or free wheeling fashion. Where a lower flight of the continuous loop chain engages a lower aspect of the invention's rearward drive sprocket, a rearward leg powered driving motion imposed upon the seat tends to drive both the sprocket support member and the rearward drive sprocket rearwardly with respect to such lower flight. Such relative motion tends to counter-rotate the rearward drive sprocket, and the inclusion of a one way ratchet as a component of the invention's first mounting means advantageously resists such relative counter-rotation of the rearward drive sprocket. Such ratchet induced counter-rotation restriction advantageously temporarily establishes a direct mechanical link between the chain's lower flight and the seat. Accordingly, such one way sprocket adapted first mounting means component advantageously translates rearward leg driving of the seat to a rearward pull against the lower flight of the continuous loop chain. A forward or first idler sprocket serves as a transition between the lower flight of the chain and its upper flight which translates the rearward pull upon the chain's lower flight into a forward upper flight pull which rotates the vehicle's rearward propulsion sprocket. Such preferred first mounting means ratchet component freely allows rotation of the rearward drive sprocket with respect to the lower flight of the chain during an arm powered return stroke of the seat and attached sprocket support member.

The invention's forward drive sprocket and an associated second mounting means are preferably configured, constructed, and operated in a mirroring fashion, provided that the continuous loop chain's upper flight oppositely engages an upper aspect of the invention's forward drive sprocket. One way ratchet locking of such forward drive sprocket against counter-rotation may directly forwardly pull the chain's upper flight over the vehicle's rearward propulsion sprocket for forwardly propelling the vehicle. An alternative opposite idler function of such second mounting means ratchet component similarly allows free and unrestricted sprocket rotation upon a next successive rearward stroke of the seat and sprocket support member.

The instant inventive vehicle preferably further comprises a variable ratio transmission, suitably a multi-speed hub gear, which controls translation of rotary torque from the rearward propulsion sprocket to the rearward drive axle and the attached rearward drive wheel. During leg driven propulsion of the vehicle, which is typically relatively strong and robust in comparison to arm powered vehicle propulsion, a relatively high gear ratio may be advantageously utilized. The invention's capacity for associating a high gear ratio with a leg powered propulsion mode of use allows a relatively high vehicle speed to be maintained during leg exercising propulsion.

In order to maintain such high vehicle speed during leg exercise, it is often desirable that the leg powered rearward strokes against the seat occur in quick succession. To facilitate a quick succession of leg drives, means are preferably provided for selectively disengaging and disabling the invention's forward drive sprocket and ratchet. Such disengagement may advantageously allow an operator of the vehicle to utilize arm pulling power against provided handlebars to relatively quickly pull the seat back to its forward position after a leg drive. A selected deactuation of the forward drive ratchet advantageously eliminates any requirement that the forward seat motion translate torque rearwardly via a variable ratio transmission which has been set at a high gear for translating leg power. Accordingly, in order for the vehicle to perform its dual modes leg and arm exercise, the vehicle preferably incorporates both paired one way ratchets and means for selectively actuating and deactuating such ratchets. Commonly known selective settable one way clutches and one way rotary bearings may be utilized as a substitute for the one way ratchet components discussed above, and such commonly known substitute components are considered to fall within the scope of the invention.

Accordingly, objects of the instant invention include the provision of a leg and arm powered vehicle which incorporates structures, as described above, and which arranges those structures in relation to each other in manners described above, for achievement of the functions and benefits described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
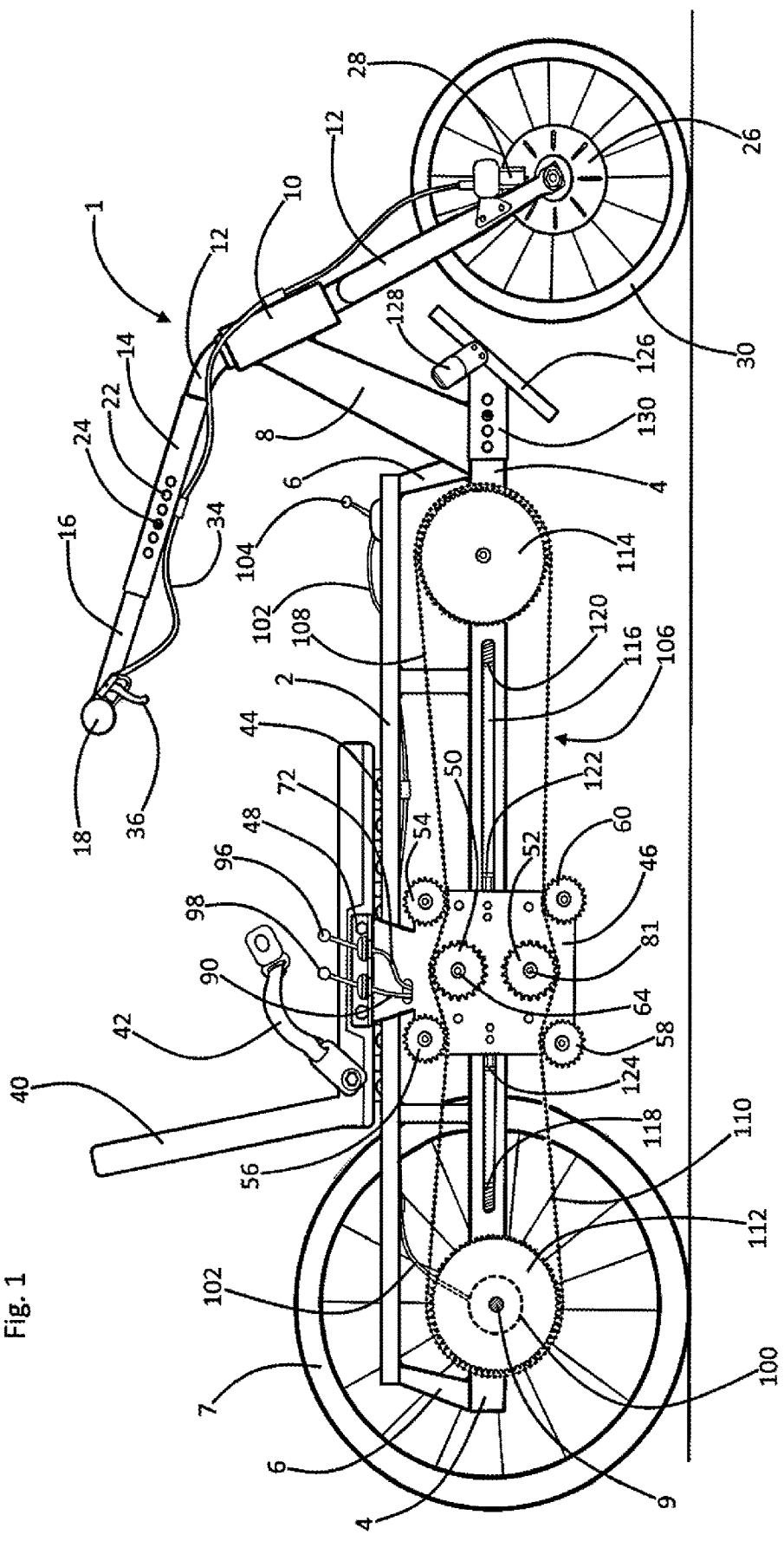
FIG. 1 is a side view of a preferred embodiment of the instant inventive leg and arm powered vehicle.

Referring now to the drawings, and in particular to Drawing FIG. 1, a preferred embodiment of the instant inventive leg and arm powered vehicle is referred to generally by Reference Arrow 1. The vehicle 1 comprises a rigid frame comprising an upper longitudinally extending member 2, a lower longitudinally extending member 4, and a plurality of vertically interconnecting members 6.

A seat 38,40 is preferably provided, such seat having seat belts 42, and having lower rollers 44. The longitudinally extending rail 2 is preferably configured as a roller track for facilitating reciprocating frontward and rearward rolling motions of the seat 38,40 along the frame. Rollers 44 are intended as being representative of slide or skid components which may suitably be alternatively utilized for facilitating the front to rear reciprocating seat motion.

A rear drive wheel or vehicle propulsion wheel 7 is provided, such wheel being mounted for powered rotation upon a laterally extending drive axle 9, such axle being mounted rotatably with respect to the frame 2,4,6. The vehicle 1 of FIG. 1 preferably constitutes a tricycle having the left propulsion wheel 7, and having the right rear stabilizing wheel which is not shown within the view. A rearward wheel propulsion sprocket 112 is preferably provided in combination with the propulsion wheel 7. Rotary torque provided by such sprocket 112 to the wheel 7 may translate through an axle 9 via a variable ratio hub transmission 100 which is shown in dashed lines upon FIG. 1. A co-axial actuator cable 102 which is operated via gear shift lever 104, may be utilized for changing the gear setting of transmission 100, such transmission having a multi-step spectrum of rotary power transfer ratios between a high gear and a low gear.

The front end of the frame preferably comprises a steering support column 8 whose upper end supports a cylindrical steering hub 10. A steering fork 12 is mounted rotatably within hub 10, and a front steerable wheel 30 is mounted rotatably to such fork 12. Handlebars 14,16 extend rearwardly, such handlebars preferably being adjustable, including telescoping extension and retraction facilitating components such as adjustment eyes 22, and depressible lock pins 24. In use of the inventive vehicle, handles 18 may be grasped and engaged by an operator seated upon seat 38,40 for alternatively pulling and pushing upon such seat. A disk and caliper brake assembly 26,28 is preferably provided, such brake assembly being actuatable via hand brake lever 36 and an interconnecting co-axial actuator 34.

Foot pedals 126 having foot straps 128 are preferably provided, such pedals being attached to the forward end of the frame. In a preferred embodiment, the longitudinal positions of such foot pedals are adjustable and may suitably incorporate telescopingly extendable and retractable sections 130 for accommodating operators having different arm and leg lengths.

A continuous loop chain component is referred to generally by Reference Arrow 106, such chain preferably constituting a bicycle chain having upper and lower flights 108 and 110. A continuously cycling transition of the chain 106 between the upper and lower flights 108 and 110 is preferably provided by a first idler sprocket 114 which is mounted rotatably to the frame 2,4,6. In operation of the continuous loop chain 106, a rearward pulling force applied to the chain's lower flight 110 translates via idler sprocket 114 to a forward pulling force at upper flight 108. Such upper flight forward pulling force translates to rotational torque applied to the rear propulsion sprocket 112. Forward pulling forces which are applied directly to the upper flight 108 similarly provide such rotational torque to sprocket 112 for continued forward vehicle propulsion.

In order to translate reciprocating frontward and rearward motions of the seat 38,40 along the frame 2,4,6 to the flights 108 and 110 of the continuous loop chain 106, a sprocket support member 46 is preferably provided. In a preferred embodiment, the sprocket support member 46 comprises a rigid plate having an upper end mounting bracket 48 which is fixedly and rigidly mounted to the seat 38. Such plate configured support member 46 preferably laterally overlies chain flights 108 and 110. The plate 46 is preferably aligned with the flights 108 and 110 so that it may move parallel with such flights while the seat 38,40 reciprocatingly moves forwardly and rearwardly along the frame.

In order to support and stabilize the sprocket support member 46 during its reciprocating forward and rearward travel along the frame, slide guide members 122 and 124 are preferably mounted to the plate 46. Such slide guides 122 and 124 may be slidably received within a longitudinally extending guide slot 116 within frame member 4. Extreme forward motions of the seat 38,40 and the support member 46 are advantageously stopped and cushioned by a front spring damper 120, and a rear spring damper 118 may be similarly provided for cushioning and stopping extreme rearward seat motions.

Figure 2:
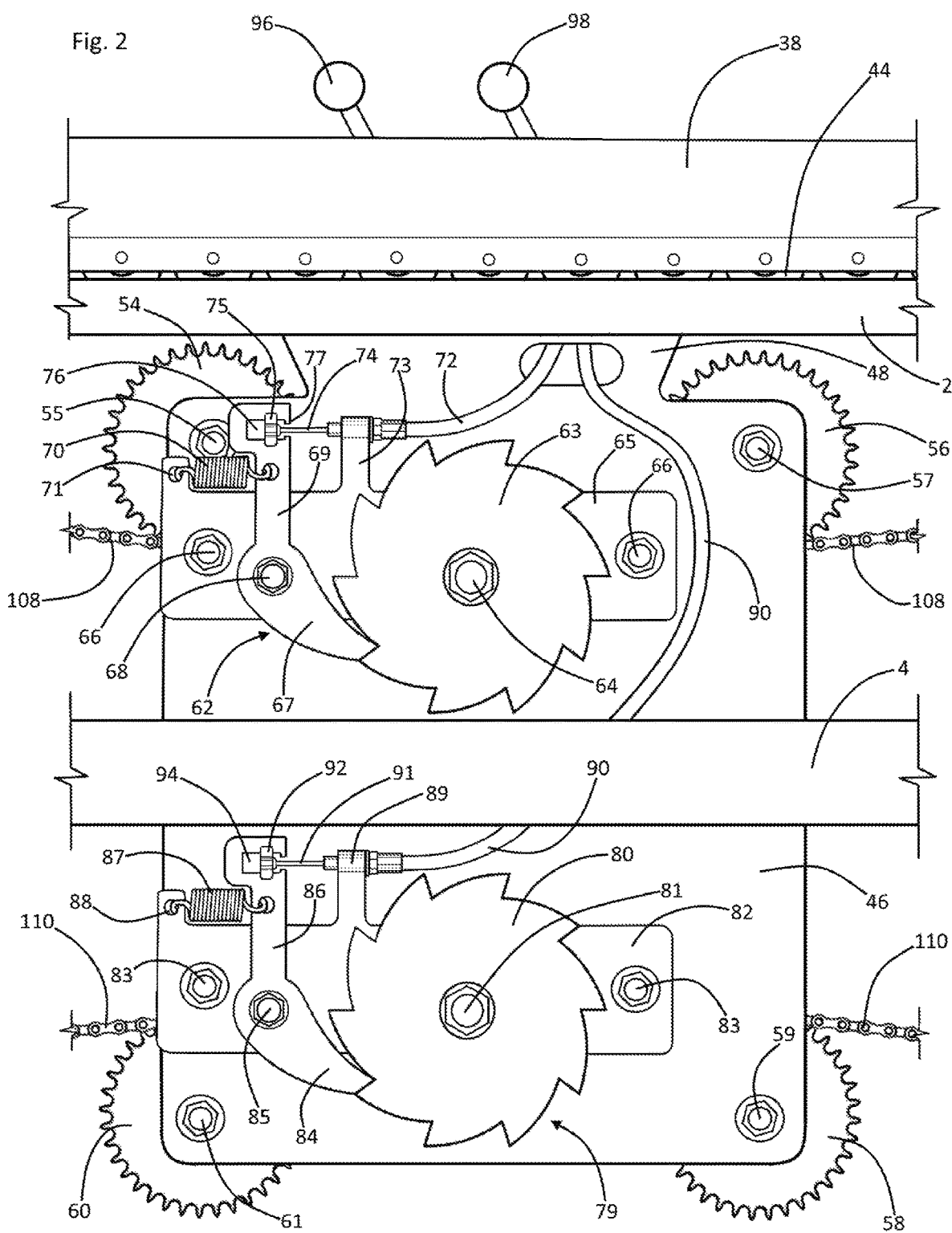
FIG. 2 is a partial and opposite side view of the structure of FIG. 1.

Referring simultaneously to FIGS. 1 and 2, a rearward drive sprocket 52 is preferably provided, the lower aspect or lower teeth of such sprocket 52 preferably engaging the lower flight 110 of the continuous loop chain 106. The rearward drive sprocket 52 is preferably operatively attached to the support member 46 by specialized first mounting means which are adapted for resisting counter-rotation of such sprocket 52 and for permitting rotation of such sprocket.

Where such means' counter-rotation resisting function is actuated and operable, and where the operator is seated upon seat 38,40 with feet engaging foot pedals 126, the operator may extend his or her legs against such pedals to drive the seat rearwardly along the frame. Such rearward seat driving motion simultaneously rearwardly drives sprocket plate 46 and tends to move the rearward drive sprocket 52 rearwardly in relation to the lower flight 110 of the continuous loop chain 106. Such relative motion of the sprocket 52 and the chain flight 110 tends to counter-rotate the sprocket 52. Such sprocket's capacity for resisting counter-rotation advantageously establishes a temporary rigid link between the chain's lower flight 110 and the seat 38,40. Accordingly, such leg powered rear driving action against the seat 38,40 simultaneously pulls the lower flight 110 rearwardly, and pulls the upper flight 108 forwardly over sprocket 114, forwardly propelling the vehicle.

Upon a full rearward leg driven motion of the seat 38,40 along the frame, the seat must be returned to its forward position in order to facilitate a next successive leg power stroke. During each of such forward seat returning motions it is necessary that the above described rigid linking effect between sprocket 52 and lower flight 110 be terminated, such linkage termination allowing sprocket 52 to move forwardly along the lower flight 110 without exerting forward traction against such flight. In order to facilitate such seat return motion, the instant invention requires that the rearward drive sprocket 52 be capable of freely rotating in an idler or free wheeling fashion.

An exemplary mechanism for alternatively restricting counter-rotation of sprocket 52 and permitting free wheeling rotation of such sprocket is referred to generally by Reference Arrow 79. A lateral axle 81 interconnects a ratchet wheel 80 with sprocket 52, such axle 81 being supported upon a mounting plate 82, which in turn is supported upon a ratchet support plate 46 by mounting bolts 83. Counter-rotational forces applied to the sprocket 52 tend to turn ratchet wheel 80 clockwise according to the perspective of FIG. 2. To counter such force, a pawl 84 may pivotally mounted to plate 82 by means of a pivot pin 85, such pawl being pivotable to the engaged position indicated in FIG. 2. The engagement of the pawl 84 resists counter-rotations of the sprocket 52. While pawl 84 is engaged as indicated in FIG. 2, sprocket 52 cannot counter-rotate, such engagement providing a temporary rigid mechanical link between the seat 38,40 and the lower flight 110 of the continuous loop chain 106. A spring 87 which spans between an eye 88 at the front end of the plate 82 and a pawl arm 86, normally biases the pawl 84 into the depicted engaged sprocket counter-rotation stopping position.

An opposite forward pulling force applied to the seat 38,40 via seat belts 42 may drive plate 46 forwardly, such force moving sprocket 52 forwardly along chain flight 110. Such forward sprocket motion rotates sprocket 52, and such rotation produces counter-clockwise movement of ratchet wheel 80 according to the view of FIG. 2. Such counter-clockwise rotation is freely allowed by the pawl 84 and the biasing spring 87. Accordingly, the invention's first mounting means component represented by ratchet wheel 80 and pawl 84 advantageously dually functions for resisting counter-rotation of sprocket 52 and freely permitting rotation of such sprocket. According to the operation of such first mounting means, the vehicle may be propelled by successive applications of rear leg drives against the seat 38,40 with intervening free forward rolling motions of the seat.

In order to allow a forward pull exerted by the seated operator against handles 18 and against seat belt 42 to similarly forwardly propel the vehicle 1, an overlying forward drive sprocket 50 is preferably provided, such sprocket 50 attaching via lateral axle 64 to an overlying ratchet assembly which is referred to generally by Reference Arrow 62. Similarly with assembly 79's co-rotating axle attachment of ratchet wheel 80 with rearward drive sprocket 52, an overlying laterally extending axle 64 interconnects ratchet wheel 63 with the overlying forward drive sprocket 50. An overlying ratchet assembly mounting plate 65 attached to plate 46 by mounting bolts 66 is similarly provided, and a similarly functioning sprocket counter-rotation locking pawl 67 which pivots upon pivot pin 68 is also provided. A second spring 70 spanning between pawl arm 69 and spring attachment eye 71 is also provided, such spring 70 and arm 69 normally biasing pawl 67 to the depicted engaged position. Engagement of the ratchet wheel 63 by the spring biased pawl 67 causes the forward drive sprocket 50 to be locked against counter-rotation. Such locking provides a secure mechanical link between the upper flight 108 of the continuous loop chain 106 and the wheel drive sprocket 112 while the seat 38,40 is pulled forwardly. Such ratchet alternatively allows sprocket 50 to freely rotate while the plate 46 is driven rearwardly.

In use of the instant inventive vehicle 1, an operator seated upon seat 38,40 may desire to exercise only his or her arm muscles, while forwardly propelling the vehicle. During such mode of vehicle operation, the operator may simply grasp handlebar handles 18 and may alternatively apply pushing and pulling forces. Such pulling and pushing exertions roll the seat 38,40 alternatively forwardly and rearwardly along the frame while simultaneously forwardly and rearwardly moving the sprocket support member 46 along with its attached components. During such arm pulling and pushing exercise, the vehicle's variable ratio transmission 100 may be advantageously set at a relatively low gear ratio which is amenable to arm powered vehicle propulsion. During such arm pulling and pushing exercise, ratchet wheels 63 and 80 along with their spring biased pawls 67 and 84 assure that each arm pulling motion draws chain flight 108 forwardly via sprocket 50 with little or no resistance from sprocket 52, and assures that each arm pushing motion rearwardly draws chain flight 110 via sprocket 52 with little or no resistance from sprocket 50.

In an alternate mode of vehicle propelling exercise which may be performed in the use of the inventive vehicle, the operator may utilize his or her legs to forcefully rearwardly drive the seat 38,40. During such rearward leg driving action, sprocket 52 and its ratchet wheel 80 adapted first mounting means components produce a forward vehicle propelling effect in a manner substantially identical to the forward handlebar pushing action described above. To take advantage of the additional power which is typically provided by the operator's leg muscles, transmission 100 may be set to a higher gear (through manipulation of shift lever 104) in order to propel the vehicle at a higher speed. The return stroke or motion of the seat 38,40 is typically provided via arm pulling against handles 18, or with supplemental leg powered pulling facilitated by engagement of the operator's feet with foot straps 128. Where the transmission 100 has been set at such leg power utilizing high gear, the operator may not be able to quickly forwardly move the seat 38,40 against such high transmission gear.

During the above described leg exercising operation of the vehicle, it may be desirable for the operator to execute several rear leg drives in quick succession. During such exercise, the above described difficulties in forward arm pulls of the seat 38,40 between successive rear leg drives may undesirably interfere with the leg exercise and may undesirably slow the vehicle.

In order to prevent the above described transmission induced mechanical interference with leg driving exercise, mechanical selecting means are preferably provided for deactuating the capacity of the forward drive sprocket to lock against counter-rotation, such deactuation effectively converting such sprocket from a one way rotation element into a freely rotating idler sprocket. FIG. 2 portrays an exemplary selecting means comprising an actuator cable 72 having an extendable and retractable core 74, the distal end of such cable 72 being rigidly anchored upon plate 65 by means of mounting arm 73. The cable core 74 attaches to a slide mount 75 which is longitudinally slidably movable along a slide track 76. While core 74 and slide mount 75 remain fixed in the position depicted, pawl 67 and pawl arm 69 may reciprocatingly rotate about pivot pin 68 while the distal end of pawl 67 slides over the ratchet's teeth.

Upon rearwardly pulling lever 96, actuator core 74 is retracted along track 76 until slide mount 75 contacts stops 77. Further retraction of core 74 drives the mount 75 against the stops 77 and pivots the pawl 67 out of engagement with the teeth of ratchet wheel 63. While the lever 96 remains rearwardly pulled, the distal end of pawl 67 continuously overlies ratchet wheel 63, such pawl deactuation effectively allowing the front drive sprocket 50 to function as a freely turnable idler sprocket. Accordingly, while lever 96 is pulled and pawl 67 is deactuated, forward motion of the seat 38,40 and sprocket support member 46 with respect to chain flights 108 and 110 is relatively resistance free, advantageously allowing the operator to move the seat 38,40 quickly to a forward position for a next successive vehicle propelling leg drive.

In a preferred embodiment, a second lever 98 is provided for deactuating pawl 84 via actuator cable 90, such cable having a cable core 91 and a slide mount 92 which moves along slide track 94. A setting of the vehicle's lever 96 to actuate pawl 67 and to deactuate pawl 84 via lever 98 may advantageously facilitate a different mode of exercise wherein the vehicle 1 is propelled exclusively via pulling motions applied to handle 18 and/or foot straps 128, such successive pulling motions being intermittently accompanied with resistance-free rearward rolling motions of the seat 38,40.

The ratchet and pawl configured first and second mounting means depicted in FIG. 2 are considered to be representative of other commonly known and suitably substituted one way rotary clutch and one way rotary bearing assemblies, and the actuator cable and lever selecting means depicted in FIGS. 1 and 2 are similarly considered to be representative of other commonly known actuators which are adapted for selectively toggling such one way bearings or clutches between an idler mode of motion and a one way turning mode of motion.

In order to assist in and assure continued engagements of the upper and lower flights 108 and 110 of the continuous loop chain 106 with sprockets 50 and 52, a plurality of second idler sprockets 54, 56, 58, and 60 are preferably provided, such sprockets being rotatably mounted to plate 46 by means of axles 55, 57, 59, and 61.

While the principles of the invention have been made clear in the above illustrative embodiment, those skilled in The invention hereby claimed is:

1. A leg and arm powered vehicle comprising:
   (a) a frame having front and rear ends;
   (b) a seat, the seat being either rollably mounted or slidably mounted upon the frame for alternating frontward and rearward motions;
   (c) a wheel and sprocket combination mounted upon the frame for vehicle propelling rotations;
   (d) a continuous loop chain operatively engaging the wheel and sprocket combination's sprocket, said chain having a pair of flights;
   (e) a sprocket support member fixedly attached to the seat;
   (f) rearward and forward drive sprockets, the rearward drive sprocket engaging one of the continuous loop chain's flights, and the forward drive sprocket engaging the other of the continuous loop chain's flights;
   (g) first mounting means operatively attaching the rearward drive sprocket to the sprocket support member, said means being adapted for resisting counter-rotation of said sprocket and permitting rotation of said sprocket;
   (h) second mounting means operatively attaching the forward drive sprocket to the sprocket support member, said means being adapted for resisting counter-rotation of said sprocket and permitting rotation of said sprocket; and
   (i) hand and foot engaging members fixedly mounted to the frame, said members being positioned forwardly from the seat,
   wherein the alternating frontward and rearward motions of said seat drives said continuous loop chain to propel said vehicle.

2. The leg and arm powered vehicle of claim 1 wherein the forward and rearward drive sprockets are adapted for free rotation.

3. The leg and arm powered vehicle of claim 2 further comprising selecting means connected operatively to the rearward or forward drive sprockets, said means being adapted for selectively actuating and deactuating at least one of the first and second mounting means adaptations for resisting drive sprocket counter-rotations.

4. The leg and arm powered vehicle of claim 3 wherein the first and second mounting means comprise ratchets.

5. The leg and arm powered vehicle of claim 4 wherein the selecting means comprises at least a first co-axial actuator cable.

6. The leg and arm powered vehicle of claim 5 further comprising a variable ratio transmission connected operatively to the wheel and sprocket combination.

7. The leg and arm powered vehicle of claim 6 further comprising a first idler sprocket engaging the continuous loop chain at a transition between said chain's pair of flights.

8. The leg and arm powered vehicle of claim 7 further comprising a plurality of second idler sprockets operatively spanning between the continuous loop chain and the sprocket support member.

9. The leg and arm powered vehicle of claim 8 wherein the continuous loop chain's pair of flights comprises an upper flight and a lower flight, said flights respectively overlying and underlying the forward and rearward drive sprockets.

10. The leg and arm powered vehicle of claim 9 further comprising an upper roller track, said track underlying the seat.

11. The leg and arm powered vehicle of claim 10 further comprising a steerable wheel and steering handle combination, said combination being connected operatively to the frame.

12. The leg and arm powered vehicle of claim 11 wherein the frame comprises a guide slot connected operatively to the sprocket support member.

* * * * *